United States Patent [19]

Kimura

[11] Patent Number: 5,974,173
[45] Date of Patent: Oct. 26, 1999

[54] IMAGE DATA COLOR CORRECTION METHOD

[75] Inventor: Kenji Kimura, Yamatokoriyama, Japan

[73] Assignee: Sharp Kabushiki Kaisha, Osaka, Japan

[21] Appl. No.: 08/987,704

[22] Filed: Dec. 9, 1997

[30] Foreign Application Priority Data

Jan. 13, 1997 [JP] Japan .................................. 9-003495

[51] Int. Cl.$^6$ .................................................. G06K 9/00
[52] U.S. Cl. ........................................... 382/167; 358/523
[58] Field of Search ............................ 382/167; 358/518, 358/523, 521

[56] References Cited

U.S. PATENT DOCUMENTS 5,786,908  7/1998  Liang ........................................ 358/523
5,881,211  3/1999  Matsumura ............................... 358/523

FOREIGN PATENT DOCUMENTS

55-30222  8/1980  Japan .

Primary Examiner—Phuoc Tran
Attorney, Agent, or Firm—Dike, Bronstein, Roberts & Cushman, LLP; David G. Conlin

[57] ABSTRACT

An image data color correction method includes the step of obtaining a first error with respect to input image data by looking up a first look-up table (A), the step of obtaining a second error with respect to the first error by looking up a second look-up table (B), the step of obtaining an error coefficient on the basis of the ratio between the remainder obtained by dividing the gradation level of the input data by a predetermined number of gradation levels and the predetermined number of gradation levels, and the step of adding the first error and the product of the error coefficient and the second error to the input image data, thereby interpolating the first error and correcting the input image data.

3 Claims, 8 Drawing Sheets

IMAGE DATA COLOR CORRECTION METHOD

BACKGROUND OF THE INVENTION

1. Field of the Invention

The present invention relates to an image data color correction method of performing color correction for color image data read by a scanner or the like by using look-up tables.

2. Description of the Prior Art

In general, when a color image is read into an image processing apparatus such as a personal computer through a scanner or the like, the read image data does not always reproduce the gradation (color tone) of the original image properly because the color resolution of the scanner is influenced by the characteristics and the like of the color filter or CCD (Charge Coupled Device) in the scanner. For this reason, when the read image data is to be printed by a printer or displayed on a CRT (Cathode Ray Tube), color correction must be performed for the image data to reproduce the original gradation.

As this color correction method, a method using polynomial approximation or a three-dimensional look-up table (to be referred to as a 3D LUT or LUT hereinafter) is known. According to the method based on polynomial approximation, in general, the relationship between RGB (Red-Green-Blue) input data (R, G, and B) and their ideal values ($R_{TRUE}$, $G_{TRUE}$, and $B_{TRUE}$) is approximated using a second degree polynomial (matrix expression) like equation (1) given below, and coefficients a10 to a39 are obtained by multiple regression analysis. Color correction is then done by approximation using equation (1) whose coefficients have been obtained.

$$\begin{bmatrix} R_{TRUE} \\ G_{TRUE} \\ B_{TRUE} \end{bmatrix} = \begin{bmatrix} a11, & a12, & a13, & a14, & a15, & a16, & a17, & a18, & a19, & a10 \\ a21, & a22, & a23, & a24, & a25, & a26, & a27, & a28, & a29, & a20 \\ a31, & a32, & a33, & a34, & a35, & a36, & a37, & a38, & a39, & a30 \end{bmatrix} \begin{bmatrix} R \\ G \\ B \\ R^2 \\ G^2 \\ B^2 \\ R*G \\ R*B \\ G*B \\ 1 \end{bmatrix} \quad (1)$$

According to the method based on this polynomial approximation, no LUT file need be formed, and the memory capacity can be reduced accordingly. However, since this method requires complicated calculations, a long processing time is required.

In contrast to this, according to the method using an LUT, as disclosed in Japanese Patent Publication Sho 55 No. 30222, RGB (Red-Green-Blue) data (R, G, and B) are read by a scanner or the like first, and the read image data are then converted into density data (Dr, Dg, and Db). The density data are compressed into density data (Dr1, Dg1, and Db1) which can be expressed by a printer or the like with print ink. Thereafter, the data are A/D-converted to generate cyan, magenta, and yellow data (C1, M1, and Y1). In this case, by calculating density data (Dr2, Dg2, and Db2) backward to obtain the color data (C, M, and Y) of an image printed by a printer or the like, a function describing the relationship between the density data (Dr2, Dg2, and Db2) and the color data (C, M, and Y) on the image processing apparatus side can be obtained.

The image processing apparatus obtains the differences (C−C1, M−M1, and Y−Y1) between the original color data (C, M, and Y) and the color data (C1, M1, and Y1) obtained by reading the image with the scanner, and storing them as errors ($\Delta C$, $\Delta M$, and $\Delta Y$) in an LUT in advance. When the image processing apparatus is to print the image read by the scanner by using the printer, the apparatus adds the errors ($\Delta C$, $\Delta M$, and $\Delta Y$) to the color data (C1, M1, and Y1) to correct the color data into color data (C1+$\Delta C$, M1+$\Delta M$, and Y1+$\Delta Y$) so as to match the characteristics of the scanner with those of the printer, thereby correctly reproducing the color gradation of the original.

Assume that an LUT is prepared for all the gradation levels of image data read by the scanner. In this case, a large memory capacity is required to store the LUT. For this reason, an LUT is prepared for only representative points of the image data. When image data that deviate from the representative points are input, linear interpolation is performed for the LUT to perform color correction.

Figure 1:
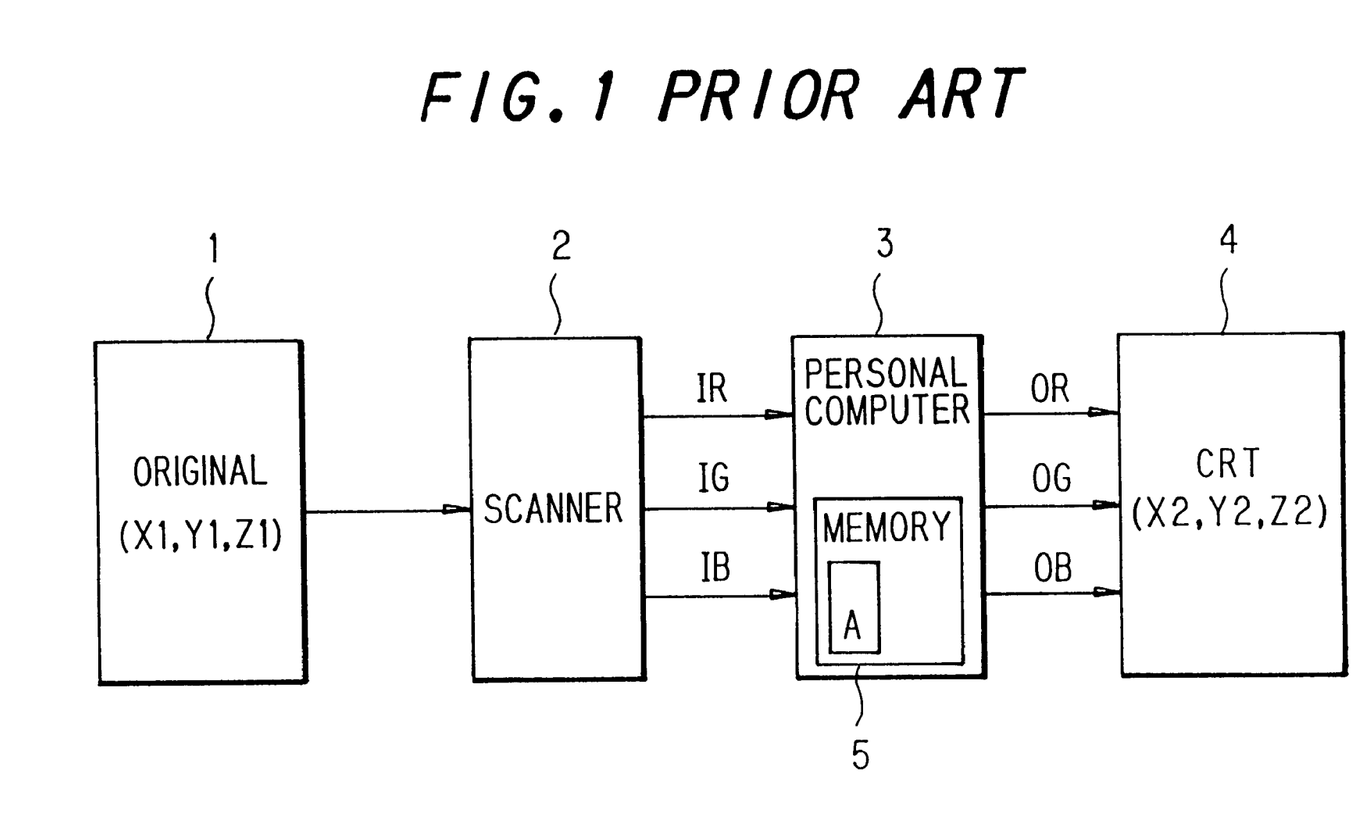
FIG. 1 is a block diagram showing the system configuration of an image processing apparatus for executing a conventional color correction method.

The conventional color correction method using the above LUT and linear interpolation for the LUT will be described further in detail with reference to FIG. 1 by taking a case in which an image on an original 1 is read by a scanner 2 to be displayed on a CRT 4 connected to a personal computer 3 as an example. As shown in FIG. 1, assuming that the image on the original 1 has color components (X1, Y1, and Z1) (the X, Y, and Z coordinates of CIE standard calorimetric system) in the XYZ calorimetric system, the scanner 2 color-separates the image on the original 1 into the three primary colors R, G, and B, and outputs data (IR, IG, and IB) in the RGB colorimetric system to the personal computer 3. These data (IR, IG, and IB) each represent the 256 gradation levels of each color component in a general personal computer.

When the CRT 4 complies with the NTSC (National Television System Committee) system, the data (IR, IG, and IB) read by the scanner 2 themselves preferably match with values (ideal values) according to the NTSC system. As described above, however, since the color resolution of the scanner is influenced by the color filter or the like, the read data do not always comply with the NTSC system. For this reason, color correction must be performed in the above manner.

The XYZ calorimetric system values (X1, Y1, and Z1) of the original 1 in FIG. 1 can be inverted into RGB calorimetric system data (OR, OG, and OB) according to the arithmetic processing defined by the NTSC system. In addition, the input data (IR, IG, and IB) to the personal computer 3 in this case can be experimentally obtained by reading the original 1 with the scanner 2. When, therefore, the data (OR, OG, and OB) with respect to the data (X1, Y1, and Z1) on the CRT 4 and the actual input data (IR, IG, and IB) are obtained a plurality of numbers of times within the color reproduction range of the scanner, their relationship can be expressed by a function upon polynomial approximation.

By using the function obtained in this manner, the differences (OR–IR, OG–IG, and OB–IB) between the input data (IR, IG, and IB) at representative points (to be described later) and the data (OR, OG, and OB) (ideal values) complying with the NTSC system. The obtained differences are set as errors E1 (E1r, E1g, and E1b) to create a first look-up table A in FIG. 1. This table is stored in a memory 5 of the personal computer 3.

Upon reception of data (ΔR, ΔG, and ΔB) from the scanner 2, the personal computer 3 serving as an image processing apparatus having the first look-up table A looks up the look-up table A to read the errors E1 (ΔR, ΔG, and ΔB) defined with respect to the data (IR, IG, and IB), and performs correction computations:

$$OR=IR+\Delta R \quad (2a)$$

$$OG=IG+\Delta G \quad (2b)$$

$$OB=IB+\Delta B \quad (2c)$$

to correct the input data (IR, IG, and IB) into the data (OR, OG, and OB).

Assume that the errors E1 for all the colors that can be used by the personal computer 3 are stored as an LUT. In this case, although color correction can be directly performed for all input data, when, for example, 24-bit color display (16,000,000-color display) is to be performed, a memory capacity as large as 48 Mbytes is required. That is, this technique is not practical.

Figure 2:
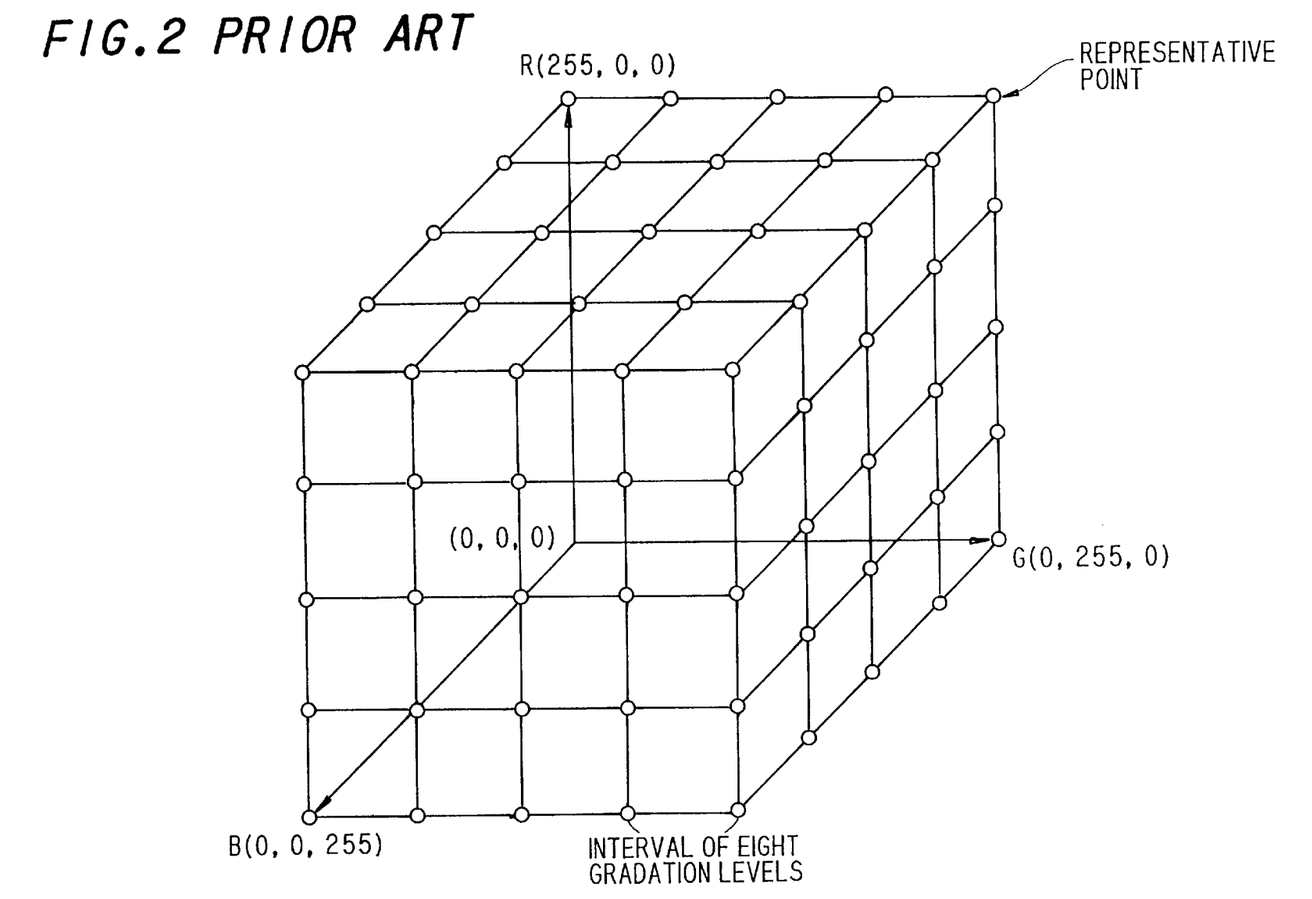
FIG. 2 is a view for explaining a color correction method using an LUT.

Assume that 256-gradation level display (16,000,000- color display) is to be performed for each of R, G, and B components, as indicated by the concept shown in FIG. 2. In this case, each of the R, G, and B components in a three-dimensional spatial coordinate system is divided in the form of a lattice in units of, e.g., eight gradation levels (a predetermined number of gradation levels) as one step, and a first look-up table A is formed from only the errors between the image data at the respective lattice points and the representative points. With this operation, the size of the LUT can be reduced, and hence the capacity of the memory 5 can be saved. The errors with respect to the image data at the representative points will be referred to as first errors hereinafter. That is, the first look-up table A contains the first errors.

In the case shown in FIG. 2, the R, G, and B components are divided into four equal parts in units of eight gradation levels as one step in the respective directions of R, G, and B. However, even if, for example, they are divided into 32 equal parts to increase the number of representative points, the resultant first look-up table A can be stored in the memory 5 in FIG. 1 if it has a memory capacity of about 96 Kbytes.

According to this method, when the data (IR, IG, and IB) input from the scanner 2 are image data at representative points, color correction can be properly performed by looking up the first look-up table A and using equations (2a) to (2c) given above. If, however, the image data deviate from representative points, the errors to be looked up are not present in the first look-up table A.

Figure 3:
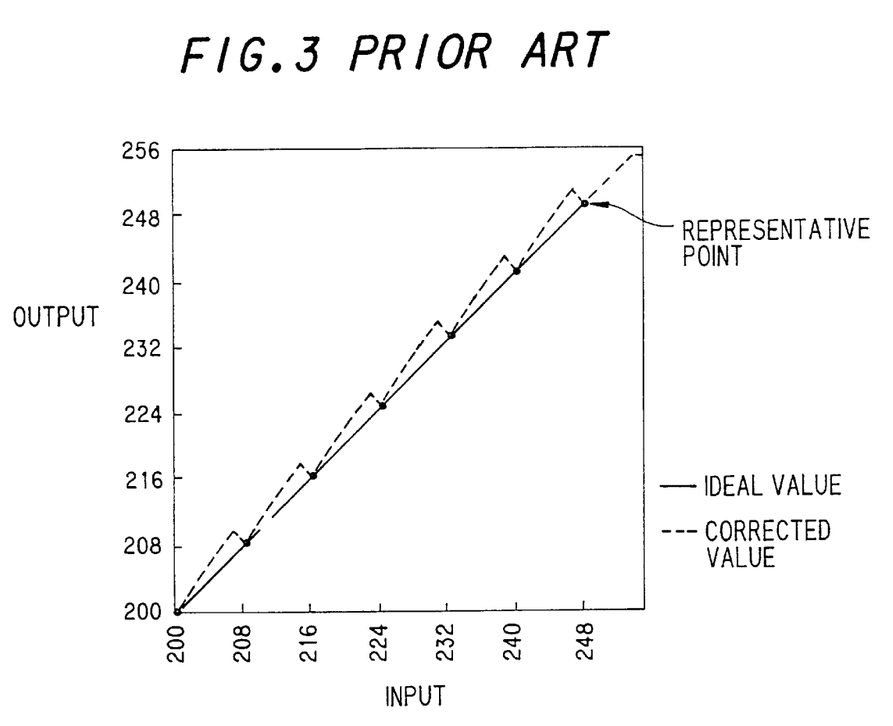
FIG. 3 is a graph showing the color correction characteristics based on the conventional color correction method.

In this case, if equations (2a) to (2c) given above are directly used, the inputs (IR, IG, and IB) do not coincide with the outputs (OR, OG, and OB) except for the representative points, as indicated by the color correction input/ output characteristics in FIG. 3, resulting in poor gradation reproducibility. If color correction is performed for the image data with such characteristics, an undesired phenomenon such as a Mach band occurs.

To perform proper color correction for image data deviating from representative points, therefore, linear interpolation is performed for the first errors in the first look-up table A to obtain proper errors. As disclosed in Japanese Patent Publication Sho 55 No. 30222, in the prior art, linear interpolation is performed by computing the following equations for each image point:

$$C = C_{l'm'n} + \{(R - R_l)/(R_{l+1} - R_l) \times (C_{l+1'm'n} - C_{l'm'n})\} +$$
$$\{(G - G_m)/(G_{m+1} - G_m) \times (C_{l'm+1'n} - C_{l'm'n})\} +$$
$$\{(B - B_n)/(B_{n+1} - B_n) \times (C_{l'm'n+1'} - C_{l'm'n})\} \equiv$$
$$C_{l'm'n} + \Delta R_1 \cdot \Delta C_{l+1'm'n} + \Delta G_m \cdot \Delta C_{l'm+1'n} + \Delta B_n \cdot \Delta C_{l'm'n+1}$$

$$M = M_{l'm'n} + \{(G - G_m)/(G_{m+1} - G_m) \times (M_{l'm+1'n} - M_{l'm'n})\} +$$
$$\{(B - B_n)/(B_{n+1} - B_n) \times (M_{l'm'n+1} - M_{l'm'n})\} +$$
$$\{(R - R_l)/(R_{l+1} - R_l) \times (M_{l+1'm'n'} - M_{l'm'n})\} \equiv$$
$$M_{l'm'n} + \Delta G_m \cdot \Delta M_{l'm+1'n} + \Delta B \cdot \Delta M_{l'm'n+1} + \Delta R \cdot \Delta M_{l+1'm'n}$$

$$Y = Y_{l'm'n} + \{(B - B_n)/(B_{n+1} - B_n) \times (Y_{l'm'n+1} - Y_{l'm'n})\} +$$
$$\{(R - R_l)/(R_{l+1} - R_l) \times (Y_{l+1'm'n} - Y_{l'm'n})\} +$$
$$\{(G - G_m)/(G_{m+1} - G_m) \times (Y_{l'm+1'n} - Y_{l'm'n})\} \equiv$$
$$Y_{l'm'n} + \Delta B_n \cdot \Delta Y_{l'm'n+1} + \Delta R_1 \cdot \Delta Y_{l+1'm'n} + \Delta G_m \cdot \Delta Y_{l'm+1'n}$$

where R, G and B are the R, G, and B data components before color correction, C, M, and Y are the color data components after color correction, and l, m, and n are the respective dimensions of the three-dimensional coordinate system.

When errors are defined in an LUT, the following advantages can be generally obtained. First, since the absolute values of errors in conversion for color correction or the like can be decreased, the number of bits of the errors defined in the LUT can be decreased. Second, since portions with zero errors need not be defined in the LUT, the corresponding memory capacity can be saved.

In the above method based on polynomial approximation, since no LUT is required, a large memory is not required. However, since complicated correction computations must be executed, a long processing time is required.

In the above method using an LUT, the computations for correction processing can be relatively simplified. However, a large memory is required for the LUT. According to the method in which an LUT is prepared for only representative points, the memory capacity required for the LUT can be reduced. When, however, the above linear interpolation is done by software, since complicated computations with frequent access to the memory are required, it takes much time to perform the processing. This processing therefore inevitably calls for dedicated hardware.

SUMMARY OF THE INVENTION

The present invention has been made in consideration of these problems, and has as its object to provide an image data color correction method which allows high-speed color correction processing by software without causing any deterioration in image quality in practice.

In order to solve the above problem and achieve the above object, according to the first aspect of the present invention, there is provided an image data color correction method using look-up tables, comprising (1) the step of obtaining a first error with respect to input image data by looking up a first look-up table, (2) the step of obtaining a second error with respect to the first error by looking up a second look-up table, (3) the step of obtaining an error coefficient on the basis of a ratio between a remainder obtained by dividing a gradation level of the input data by a predetermined number of gradation levels and the predetermined number of gradation levels, and (4) the step of adding the first error and a product of the error coefficient and the second error to the input image data, wherein the first look-up table defines differences between input image data at representative points, separated at intervals of the predetermined number of gradation levels, and ideal values as first errors, and the second look-up table defines a change in the first error, which occurs when the gradation level of the input image data at each of the representative points is advanced by the predetermined number of gradation levels, as a second error.

According to the second aspect of the present invention, in the image data color correction method of the first aspect, the first and second look-up tables have the same data amount, and the same addresses are assigned to the first and second look-up tables to simultaneously access the first and second look-up tables.

According to the third aspect of the present invention, in the image data color correction method of the first aspect, the first and second look-up tables have the same data amount, and consecutive addresses are assigned to the first and second look-up tables to consecutively access the first and second look-up tables.

Operations of the thus configured present inventions are described hereinbelow.

According to the image data color correction method of the first aspect of the present invention, (1) the first error with respect to input image data is obtained by looking up the first look-up table, (2) the second error with respect to the first error is obtained by looking up the second look-up table, (3) the error coefficient is obtained on the basis of the ratio between the remainder obtained by dividing the gradation level of the input data by the predetermined number of gradation levels and the predetermined number of gradation levels, and (4) the first error and the product of the error coefficient and the second error are added to the input image data.

In this case, the first error is the difference between the input image data at each of the representative points of the input image data, which are separated at intervals of the predetermined number of gradation levels, and the corresponding ideal value. Such first errors constitute the first look-up table. The second error is a change in the first error which occurs when the gradation level of the input image data at each representative point is advanced by the predetermined number of gradation levels. Such second errors constitute the second look-up table.

By multiplying the second error by the error coefficient in this manner, the second error is corrected in accordance with the deviation of the gradation level of the input image data from the representative point. In addition, by adding the second error, which is corrected by being multiplied by the error coefficient, to the first error, an error for interpolating the first error in accordance with the gradation level of the input image data is obtained. With the use of the error for interpolating the first error, even if input image data deviates from the representative point, the gradation (color tone) can be properly corrected.

According to the image data color correction method of the second aspect of the present invention, since the same addresses are assigned to the first and second look-up tables, and the two tables have the same data amount, the first and second look-up tables can be simultaneously accessed by one access operation. The first and second errors can therefore be easily looked up.

According to the image data color correction method of the third aspect of the present invention, since consecutive addresses are assigned to the first and second look-up tables, and the two tables have the same data amount, the address of the second error can be specified by shifting the address of the first error by the capacity of the first look-up table. The first and second errors can therefore be consecutively accessed and easily looked up.

DESCRIPTION OF THE PREFERRED EMBODIMENTS

An image data color correction method according to an embodiment of the present invention will be described below with reference to FIGS. 4 to 8. The same reference numerals denote the same or corresponding parts throughout the accompanying drawings, and FIG. 2 will be quoted as needed.

Figure 4:
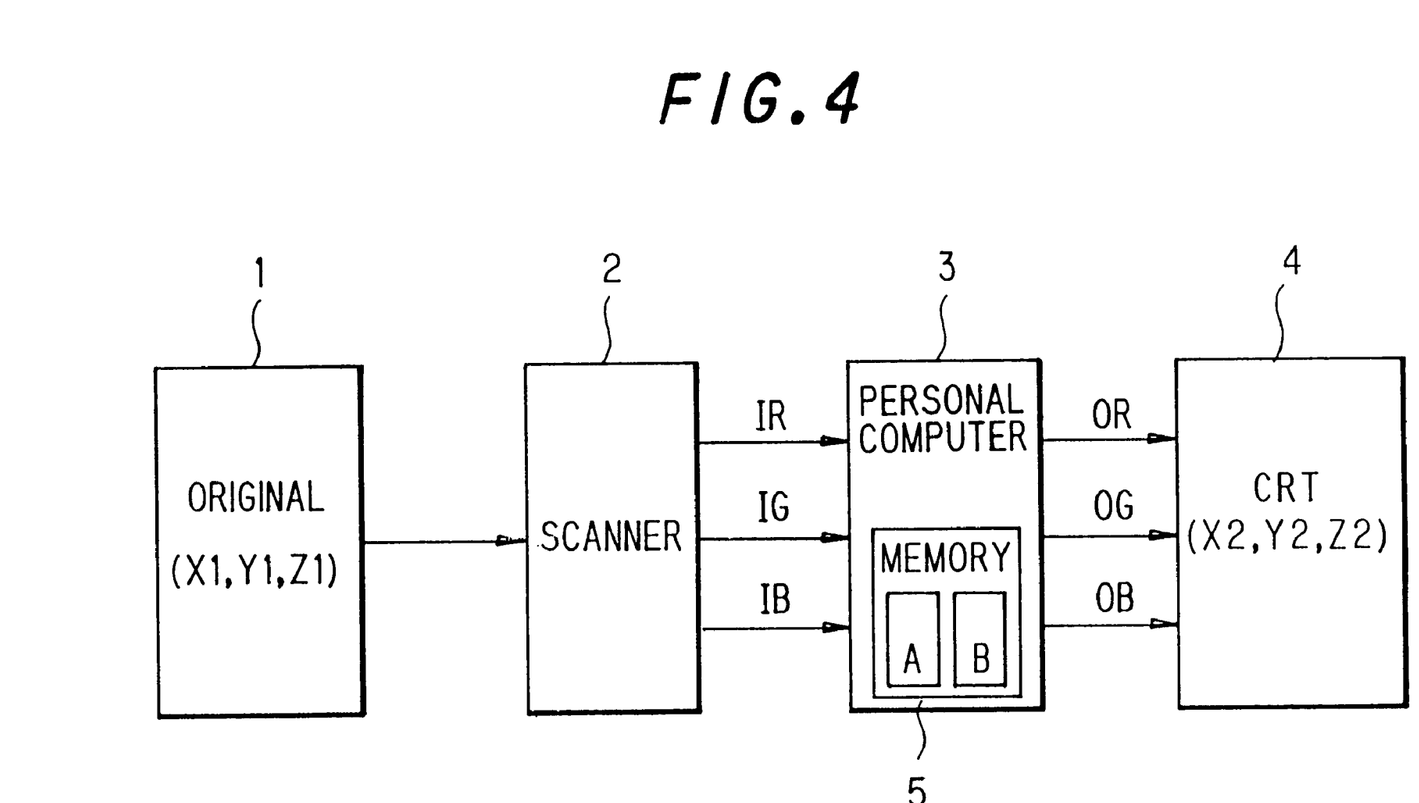
FIG. 4 is a block diagram showing the system configuration of an image processing apparatus for executing an image data color correction method according to the present invention.

As shown in FIG. 4, an apparatus for executing the color correction method of this embodiment uses the same hardware as that of the apparatus in FIG. 1 which uses the conventional method. However, in addition to the above look-up table A, a second look-up table B is stored in the memory 5 mounted in the personal computer 3 in FIG. 1. The color correction method of this embodiment uses the second look-up table constituted by second errors E2 (to be described later), and an error coefficient K, in addition to the first errors E1 with respect to the representative points of the input image data, and performs correction by calculating (Note that the third term "(E2*K)" on the right side of equation (3) is defined as an "interpolation error E12"):

$$Out(OR, OG, OB) = In(IR, IG, IB) + E1 + (E2*K) \tag{3}$$

Figure 5:
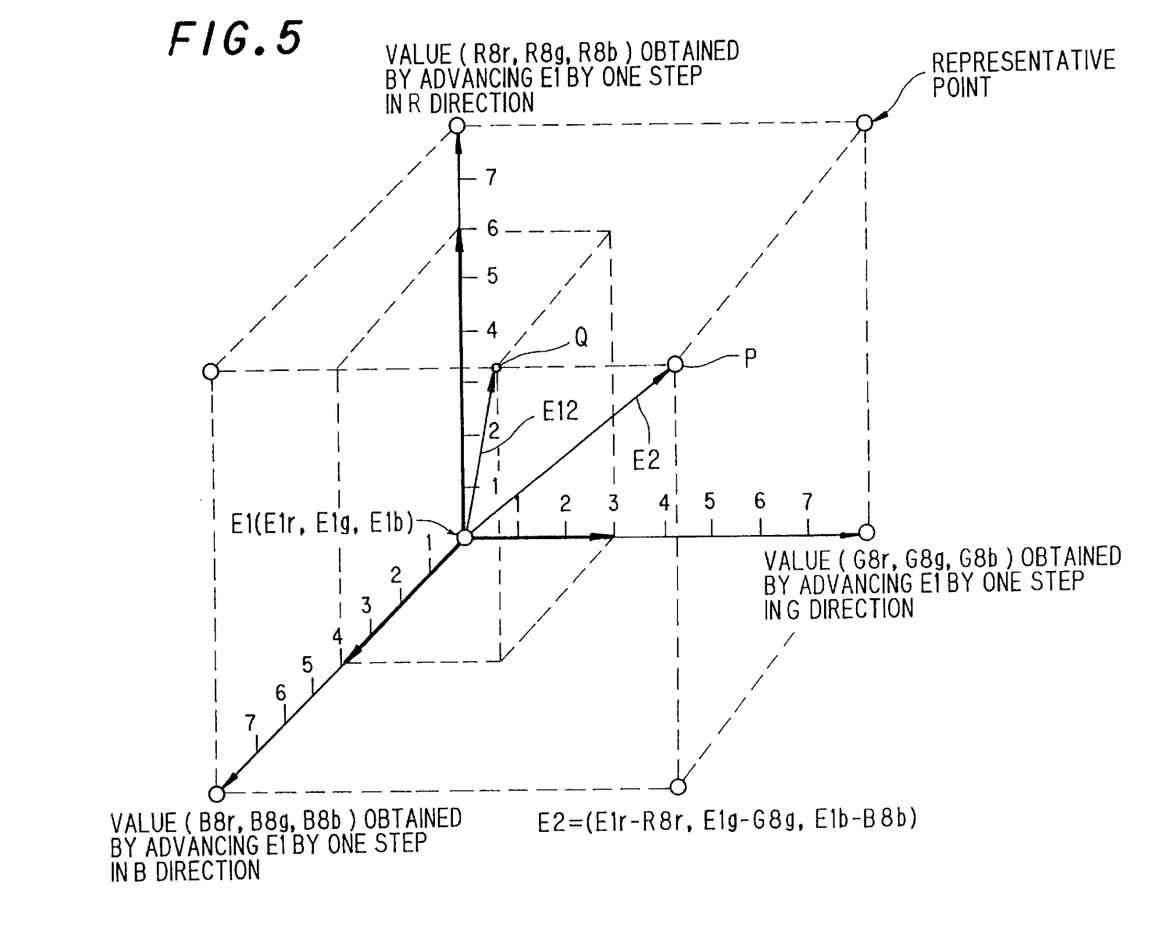
FIG. 5 is a view for explaining the image data color correction method according to the present invention.

The second errors E2 will be described first with reference to FIG. 5. The cube having eight representative points as vertexes in FIG. 5 corresponds to one of the cubes defined by the lattice in FIG. 2, and indicates the relationship between the second error E2 and the interpolation error E12 with the first error E1 being the origin. More specifically, as shown in FIG. 5, letting E1(E1r, R1g, E1b) be the first error with respect to the first look-up table which is currently looked up, R8(R8r, R8g, R8b) be the data obtained by advancing the error E1 by one step in the R direction, G8(G8r, G8g, G8b) be the data obtained by advancing the error E1 by one step in the G direction, and B8(B8r, B8g, B8b) be the data obtained by advancing the error E1 by one step in the B direction, a second error E2(E2r, E2g, E2b) is given by $$(E2r, E2g, E2b)=(E1r, E1g, E1b)-(R8r, 0, 0)-(0, G8g, 0)-(0, 0, B8b) =(E1r-R8r, E1g-G8g, E1b-B8b) \quad (4)$$

As described above, the second error E2 indicates a change in the first error data when the gradation level of the image data corresponding to the first error E1 (origin) is advanced by a predetermined number of gradation levels (eight gradation levels). This second error E2 is obtained at each representative point in FIG. 2 to form the second look-up table B. The look-up table B is then stored in the memory 5 of the personal computer 3 in FIG. 4, together with the first look-up table. In this case, as the second errors E2 are obtained at the respective first errors E1 (representative points) in FIG. 2, the first and second look-up tables A and B stored in the memory 5 in FIG. 4 have the same data amount.

The second error E2 obtained in this manner indicates a change in the first error E1 when the image data at the representative point is advanced by eight gradation levels in the above manner. If, therefore, the errors between the respective representative points continuously change, a change in the first error E1 when the image data with the gradation indicated by the origin is advanced to the gradation indicated by a point Q, i.e., the interpolation error E12, can be approximately obtained by weighting the second error E2 by the error coefficient K (to be described later) corresponding to the distance from the representative point (origin) to the point Q. By adding the interpolation error E12 to the first error E1, the error with respect to the image data at the point Q is interpolated.

The above-mentioned error coefficient K will be described below. Assume that input image data has a gradation level deviating from the representative point (origin). In this case, the respective coordinate ratios between a point P and the point Q in the respective R, G, and B component directions are determined as error coefficients K(Kr, Kg, and Kb). In this case, the respective representative points are spaced apart from each other by eight gradation levels, and the coordinate values of the point Q in FIG. 5 are 6, 3, and 4 in the R, G, and B directions, respectively. Therefore, Kr=6/8, Kg=3/8, and Kb=4/8. In this case, the coordinate values of the point Q in FIG. 5 in the R, G, and B directions are obtained as the remainder obtained by dividing the image data expressed by the coordinate space in FIG. 2 by the length (a predetermined number of gradation levels) of one side of each of the cubes defined by the lattice in FIG. 2.

Referring to FIG. 5, a first error $E1_{(Q)}(E1R_{(Q)}, E1G_{(Q)}, E1B_{(Q)})$ in the image data at the point Q deviating from the representative point (origin) is obtained by interpolation based on the following equations (Note that the second term on the right side of each equation given below is the interpolation error E12):

$$E1R_{(Q)}=E1r+E2r*Kr \quad (5a)$$

$$E1G_{(Q)}=E1g+E2g*Kg \quad (5b)$$

$$E1B_{(Q)}=E1b+E2b*Kb \quad (5c)$$

If, therefore, image data deviates from the representative point (if image data is not present in the first look-up table A), the image data is obtained from:

$$OR=IR+E1R_{(Q)} \quad (6a)$$

$$OG=IG+E1G_{(Q)} \quad (6b)$$

$$OB=IB+E1B_{(Q)} \quad (6c)$$

If, for example, the gradation level of input image data is at a representative point like (128, 64, 48) (an integer multiple of 8), the error coefficient K (the remainder obtained by dividing the image data by the predetermined number of gradation levels "8") becomes zero. Therefore, as in the case of equations (2a) to (2c), $E1R_{(Q)}=E2r$, $E1G_{(Q)}=E1g$, and $E1B_{(Q)}=E1b$, and the data (OR, OG, and OB) are obtained from:

$$OR=IR+E1r \quad (7a)$$

$$OG=IG+E1g \quad (7b)$$

$$OB=IB+E1b \quad (7c)$$

If, for example, input image data is (134, 67, 52) (input image data deviates from the representative point), the coordinate values of the point Q in the R, G, and B directions become (6, 3, 4), as shown in FIG. 5. In this case, therefore, equations (5a) to (5c) are rewritten as:

$$OR=IR+E1r+E2r*(6/8) \quad (8a)$$

$$OG=IG+E1g+E2g*(3/8) \quad (8b)$$

$$OB=IB+E1b+E2b*(4/8) \quad (8c)$$

and corrected image data is obtained.

Figure 6:
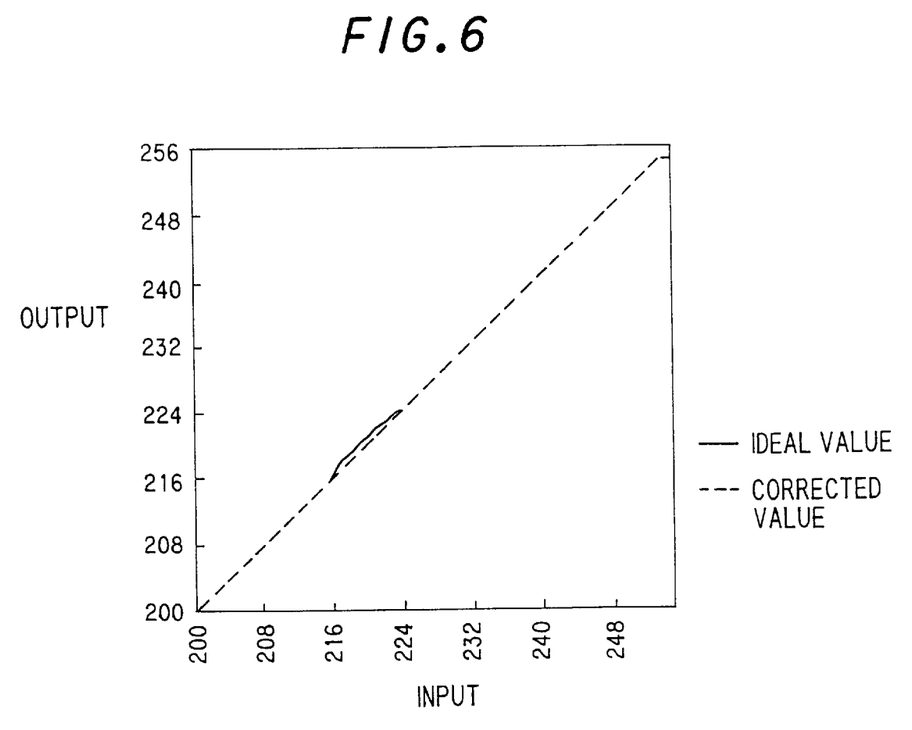
FIG. 6 is a graph showing the color correction characteristics based on the image data color correction method according to the present invention.
Figure 7:
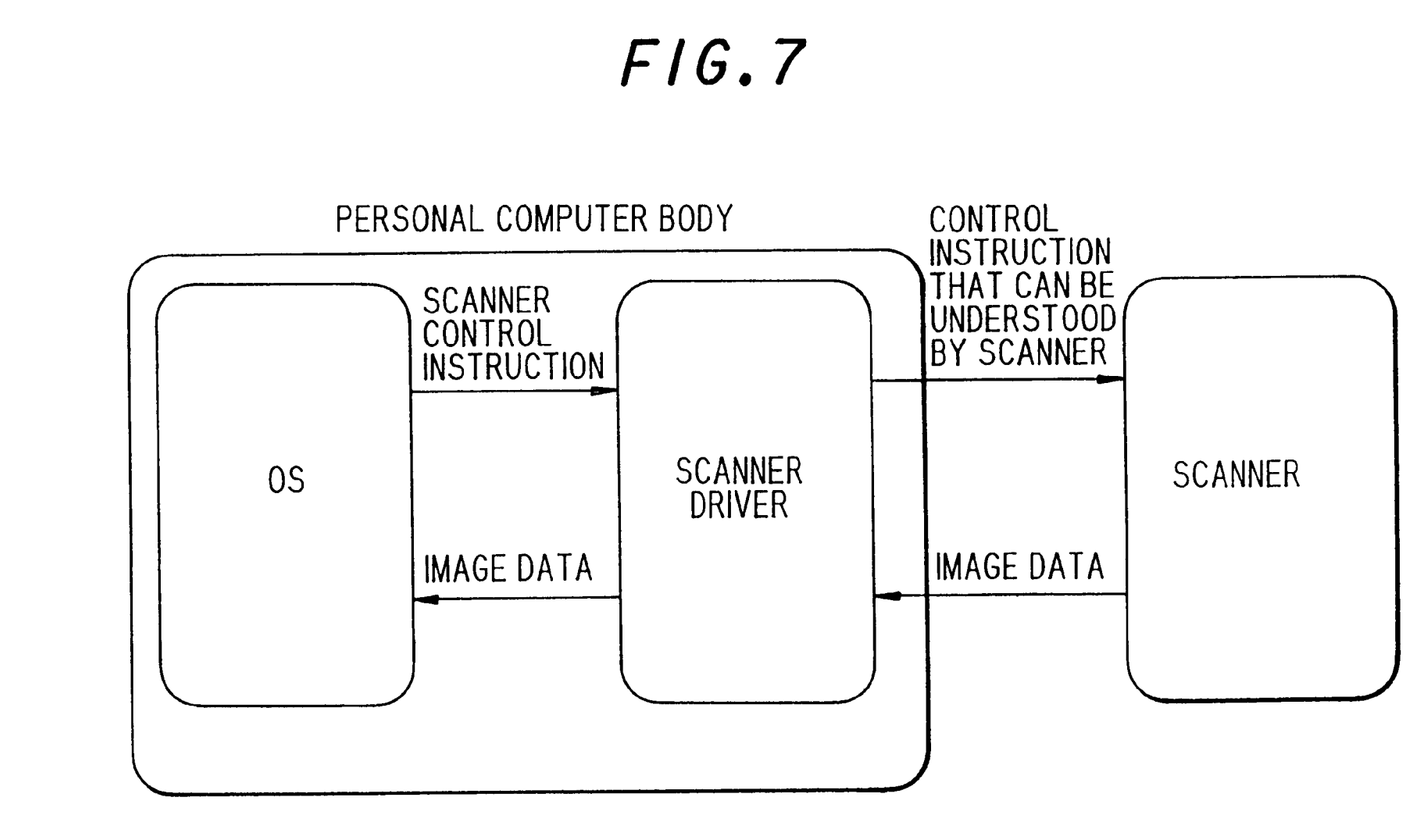
FIG. 7 is a block diagram showing the concept of a system implementing the image data color correction method according to the present invention in a scanner driver.

As described above, by interpolating the first look-up table by adding the product of the second error E2 in the second look-up table and the error coefficient K (the interpolation error E12) to the first error E1, proper correction processing can be performed for even input image data deviating from the representative point. As shown in FIG. 6, therefore, the color correction input/output characteristics are improved to be closer to ideal values, and smooth gradation can be expressed.

In addition, since the second errors E2 are calculated on the basis of the first errors E1, the first and second look-up tables have the same data amount. If the first and second errors E1 and E2 are stored while the same addresses are assigned thereto in the same order, only one address calculation is required to look up each look-up table.

If the first and second errors E1 and E2 are stored in the same order, while consecutive addresses are assigned thereto such that the second look-up table follows the first look-up table, the addresses of the second errors E2 can be specified by uniformly shifting the addresses of the first errors E1. This simplifies address calculations in looking up the second look-up table.

In interpolating the first error data E1 (the first look-up table), a shift instruction may be used when the image data is to be divided by the predetermined number of gradation levels "8", and a mask instruction may be used when the remainder is to be obtained by dividing the image data by the predetermined number of gradation levels "8". With this operation, the computation speed in interpolation can be increased, and high-speed processing can be realized.

In general, when a scanner is used on a personal computer, the scanner is controlled through software called a scanner driver that operates on an OS (Operating System). If the color correction method of this embodiment described above is implemented in the scanner driver, color correction can be performed when image data is transferred from the scanner to the scanner driver on the personal computer side.

Figure 8:
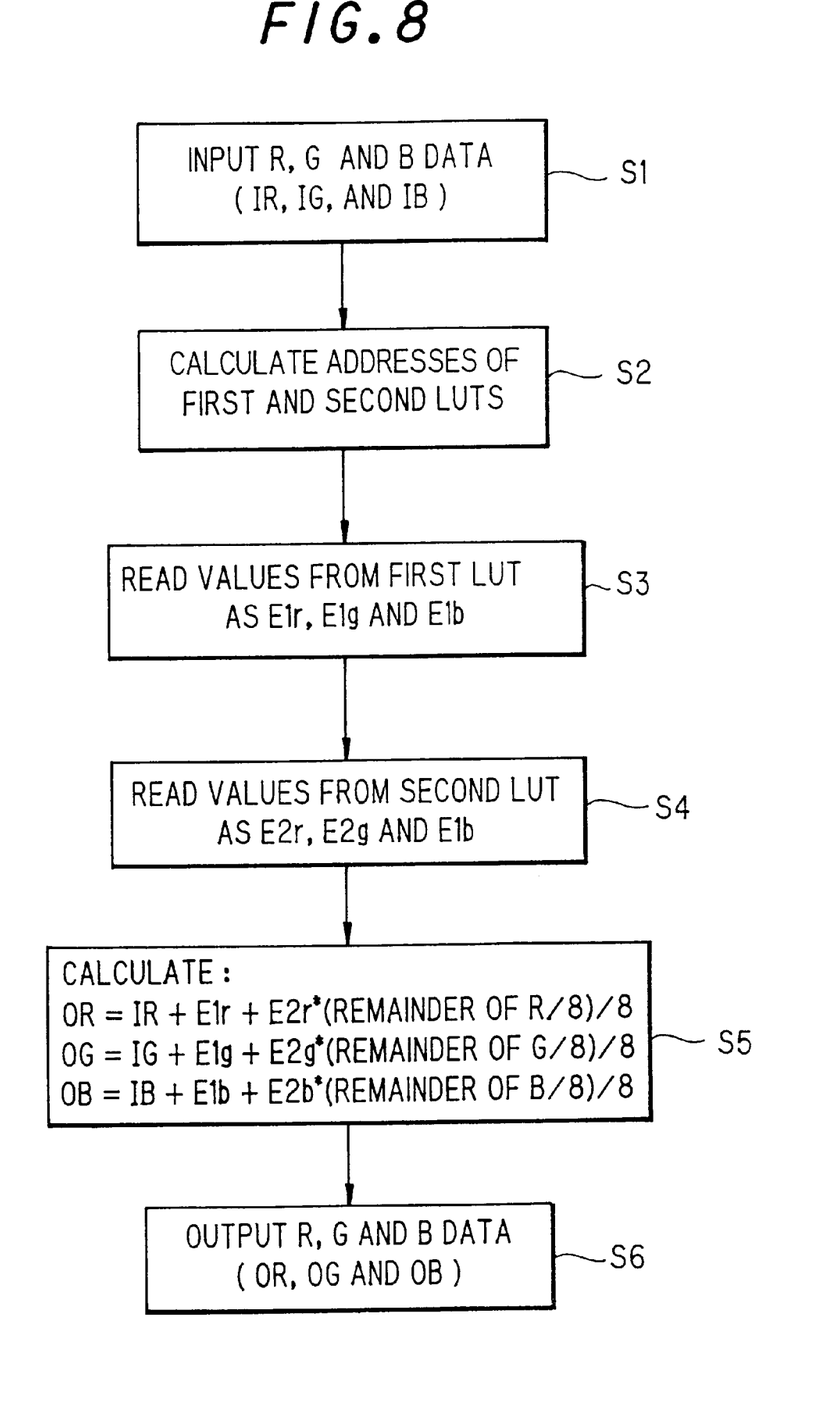
FIG. 8 is a flow chart showing a procedure for color correction to be performed when the image data color correction method according to the present invention is implemented in the scanner driver.

FIG. 8 shows a procedure for this processing. Referring to FIG. 8, when color correction is to be performed by the scanner driver installed in the personal computer, image data is input from the scanner to the scanner driver (step S1). The addresses of the first and second errors E1 and E2 corresponding to the input image data are calculated (step S2). After the first error E1 is read by looking up the first look-up table on the basis of the address calculated in step S2, the second error E2 is read by looking up the second look-up table (step S3). The correction computations based on equations (5a) to 5(c) are executed by using the first and second errors to output image data (OR, OG, and OB).

As is obvious from the above description, according to the present invention, the following effects can be obtained.

According to the first aspect of the present invention, when color correction is to be performed by looking up the look-up table defining errors (first errors) with respect to the representative points of image data, the look-up table is interpolated on the basis of the deviations from the representative points. A large memory capacity is not therefore required for the look-up table.

In addition, complicated computations required for color correction are performed in advance, and the computation results are stored as two types of LUTs in the memory. With this operation, complicated computations in color correction processing can be omitted, and the frequency of access to the memory can be decreased. For this reason, a high-quality reproduced image can be obtained by performing color correction by software at high speed without requiring dedicated hardware. The cost of the image processing apparatus (hardware) can therefore be reduced.

Furthermore, since complicated computations in color correction can be omitted, this method can be easily implemented in driver software such as a scanner driver, and can be easily implemented by the software. Since both the first and second look-up tables are associated with errors, the number of bits (the bit length of each error) of each look-up table can be reduced, and the memory capacity can be saved as each error decreases.

According to the second aspect of the present invention, since the same addresses are assigned to the first and second look-up tables, the first and second look-up tables can be looked up by one address calculation, thereby realizing simple, high-speed processing.

According to the third aspect of the present invention, since consecutive addresses are assigned to the first and second look-up tables, when an address calculation is performed for one look-up table, an address calculation for the other look-up table can be simplified. In this case as well, simple, high-speed processing can be realized. In addition, since no identical addresses are used, the first and second look-up tables can be stored in a single memory. The number of memories to be used can therefore be decreased.

What is claimed is:

1. An image data color correction method using look-up tables, comprising:

(1) the step of obtaining a first error with respect to input image data by looking up a first look-up table;

(2) the step of obtaining a second error with respect to the first error by looking up a second look-up table;

(3) the step of obtaining an error coefficient on the basis of a ratio between a remainder obtained by dividing a gradation level of the input data by a predetermined number of gradation levels and the predetermined number of gradation levels; and (4) the step of adding the first error and a product of the error coefficient and the second error to the input image data, wherein said first look-up table defines differences between input image data at representative points, separated at intervals of the predetermined number of gradation levels, and ideal values as first errors, and said second look-up table defines a change in the first error, which occurs when the gradation level of the input image data at each of the representative points is advanced by the predetermined number of gradation levels, as a second error.

2. An image data color correction method according to claim 1, wherein said first and second look-up tables have the same data amount, and the same addresses are assigned to said first and second look-up tables to simultaneously access said first and second look-up tables.

3. An image data color correction method according to claim 1, wherein said first and second look-up tables have the same data amount, and consecutive addresses are assigned to said first and second look-up tables to consecutively access said first and second look-up tables.

* * * * *